United States Patent
Park et al.

(10) Patent No.: US 7,665,108 B2
(45) Date of Patent: Feb. 16, 2010

(54) BROADCASTING PROGRAM VIEWING METHOD USING ELECTRONIC PROGRAM GUIDE AND SYSTEM THEREOF

(75) Inventors: Jong-Seok Park, Gunpo (KR); Sang-Wook Lim, Gunpo (KR)

(73) Assignee: LG Electronics Inc., Seoul (KR)

( * ) Notice: Subject to any disclaimer, the term of this patent is extended or adjusted under 35 U.S.C. 154(b) by 1085 days.

(21) Appl. No.: 10/301,711

(22) Filed: Nov. 22, 2002

(65) Prior Publication Data

US 2003/0101456 A1 May 29, 2003

(30) Foreign Application Priority Data

Nov. 23, 2001 (KR) .................. 10-2001-0073202

(51) Int. Cl.
 G06F 3/00 (2006.01)
 H04N 5/445 (2006.01)
 G06F 13/00 (2006.01)
(52) U.S. Cl. ..................... 725/51; 725/58; 725/61; 725/50
(58) Field of Classification Search ............ 725/50, 725/51, 58, 61
 See application file for complete search history.

(56) References Cited

U.S. PATENT DOCUMENTS

| | | | |
|---|---|---|---|
| 5,699,107 A * | 12/1997 | Lawler et al. ............. | 725/58 |
| 6,209,129 B1 * | 3/2001 | Carr et al. ................. | 725/42 |
| 6,631,523 B1 * | 10/2003 | Matthews et al. .......... | 725/53 |
| 6,675,385 B1 * | 1/2004 | Wang ........................ | 725/39 |
| 6,732,372 B2 * | 5/2004 | Tomita et al. .............. | 725/47 |
| 6,822,661 B2 * | 11/2004 | Sai et al. ................... | 715/716 |
| 6,990,676 B1 * | 1/2006 | Proehl et al. .............. | 725/40 |
| 6,990,678 B2 * | 1/2006 | Zigmond ................... | 725/51 |
| 7,047,550 B1 * | 5/2006 | Yasukawa et al. .......... | 725/44 |
| 7,165,266 B2 * | 1/2007 | Zigmond ................... | 725/131 |
| 2002/0060750 A1 * | 5/2002 | Istvan et al. ............... | 348/569 |
| 2002/0078448 A1 * | 6/2002 | Wakahara ................. | 725/39 |
| 2002/0144289 A1 * | 10/2002 | Taguchi et al. ............ | 725/112 |
| 2004/0103439 A1 * | 5/2004 | Macrae et al. ............. | 725/109 |
| 2004/0250277 A1 * | 12/2004 | Freimann et al. .......... | 725/39 |

* cited by examiner

*Primary Examiner*—Hoang-Vu A Nguyen-Ba
(74) *Attorney, Agent, or Firm*—Birch, Stewart, Kolasch & Birch, LLP

(57) ABSTRACT

A broadcasting program viewing system using an electronic program guide and a method for the same, includes the steps of storing the EPG for guiding broadcasting programs and a tag for downloading the broadcasting programs guided to the EPG from the corresponding broadcasting program, displaying the stored EPG on the screen according to a request of a viewer and displaying the broadcasting program selected from the corresponding broadcasting station server on a screen on the basis of the tag corresponding to the selected broadcasting program when the viewer selects a specific broadcasting program from the EPG displayed on the screen and therefore, viewers can watch the preferred broadcasting programs by easily selecting them.

2 Claims, 3 Drawing Sheets

BROADCASTING PROGRAM VIEWING METHOD USING ELECTRONIC PROGRAM GUIDE AND SYSTEM THEREOF

BACKGROUND OF THE INVENTION

1. Field of the Invention

The present invention relates to a broadcasting program viewing program and particularly, to a broadcasting program viewing method using an electronic program guide (EPG) and a system thereof

2. Description of the Background Art

Generally, television broadcasting stations for broadcasting television programs guide broadcasting time of the programs, and broadcast the corresponding programs according to the guided broadcasting time unless there is a particular reason. Therefore, many viewers check their preferable broadcasting programs among the broadcasting programs which were guided to be broadcast and the times, and view the preferred broadcasting program through a television and the like in the corresponding time slot.

For instance, the television broadcasting station delivers an electronic program guide (EPG, hereafter EPG) with the broadcasting program when conducting digital broadcasting. At this time, the digital television receives the EPG delivered from the broadcasting station, stores the received EPG, and guides the broadcasting programs which were too broadcast in the later time on the basis of the current date by displaying the stored EPG on the screen according to the request of the subscriber. At this time, the viewers view the corresponding program by performing subscription recording of the corresponding broadcasting program by checking the broadcasting program which is needed and broadcasting time according to the guide of the prescribed broadcasting program or receiving the program in the corresponding broadcasting time.

On the other hand, since the digital television is limited in its internal memory capacity, just the EPG of the current date and future date are conventionally stored, and the EPG of the past date is deleted by lack of the storage capacity.

Even through the EPG is provided, many viewers who live busily in the modern society can not frequently view the preferred broadcasting program in the corresponding broadcasting time slot.

Therefore, the television broadcasting station opens a homepage using the internet, and provides broadcasting programs which were broadcast in the present through the homepage, so that the viewers download the preferred broadcasting program by connecting to the homepage of the broadcasting station through the internet with their computer systems and view the downloaded broadcasting programs.

Also, the television broadcasting station performs on air broadcasting of broadcasting programs which are currently broadcast through the homepage, so that the viewers can watch the on air programs which are currently broadcast also through the terminal such as a computer system and the like as well as the television.

However, conventionally, for the viewers to view the broadcasting programs which are currently broadcast or were broadcast in the past, provided by the television broadcasting station by building the homepage, the viewers had to search the broadcasting program to be viewed by connecting to the homepage of the television broadcasting station with their terminals such as computer systems and the like. That is, since the viewers must perform many processes until they find their preferable program, it was very inconvenient for the viewers, and it took much time to find the broadcasting program to be viewed.

SUMMARY OF THE INVENTION

Therefore, an object of the present invention is to provide a broadcasting program viewing method using electronic program guide and system thereof, with which viewers can easily select and watch broadcasting programs which were broadcast in the past.

Another object of the present invention is to provide a broadcasting program viewing method using electronic program guide and a system thereof, with which viewers can easily select broadcasting programs which were broadcast in the past, download the selected program from the corresponding broadcasting program, store the downloaded program in the broadcasting program storage means, read the stored broadcasting program, and watch the read program.

Still another object of the present invention is to provide a broadcasting program viewing system using an EPG, capable of reserving a broadcasting program which will be broadcast, downloading the preserved program so that a user can watch the broadcasting program.

To achieve these and other advantages and in accordance with the purpose of the present invention, as embodied and broadly described herein, there is provided a broadcasting program viewing method using an electronic program guide, including the steps of storing the EPG for guiding broadcasting programs and a tag for downloading the broadcasting programs guided to the EPG from a broadcasting station server, displaying the stored EPG on the screen according to a request of a viewer and displaying the selected broadcasting program on a screen on the basis of the tag corresponding to the selected broadcasting program when the viewer selects a specific broadcasting program from the EPG displayed on the screen.

To achieve these and other advantages and in accordance with the purpose of the present invention, as embodied and broadly described herein, there is provided a broadcasting program viewing system using an electronic program guide, including an electronic program guide (EPG)/tag providing server that provides an EPG for guiding broadcasting programs, and tags for downloading the broadcasting programs guided to the EPG; and a data broadcast receiving apparatus for downloading the EPG and the tags from the EPG/tag providing server, transmitting the downloaded EPG to an image displaying apparatus, receiving broadcasting programs from a corresponding broadcasting station on the basis of the tags when a viewer selects the broadcasting programs, and transmitting the broadcasting programs to the image displaying apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a broadcasting program viewing method using electronic program guide and a system thereof can store an electronic program guide (EPG) for guiding the broadcasting programs, and a tag for downloading the broadcasting programs guided in the EPG from the corresponding broadcasting program, display the stored EPG on the screen according to the request of the viewer, download the selected broadcasting program from the corresponding broadcasting station server on the basis of the tags corresponding to the selected broadcasting program, and display the downloaded broadcasting program on the screen when the viewer selects a specific broadcasting program from the EPG displayed on the screen. Therefore, the viewers can watch the programs by easily selecting their preferable broadcasting programs. The embodiment of the broadcasting program viewing system using the electronic program guide and the method for the same will be described in detail with reference to FIGS. 1 to 2B.

Figure 1:
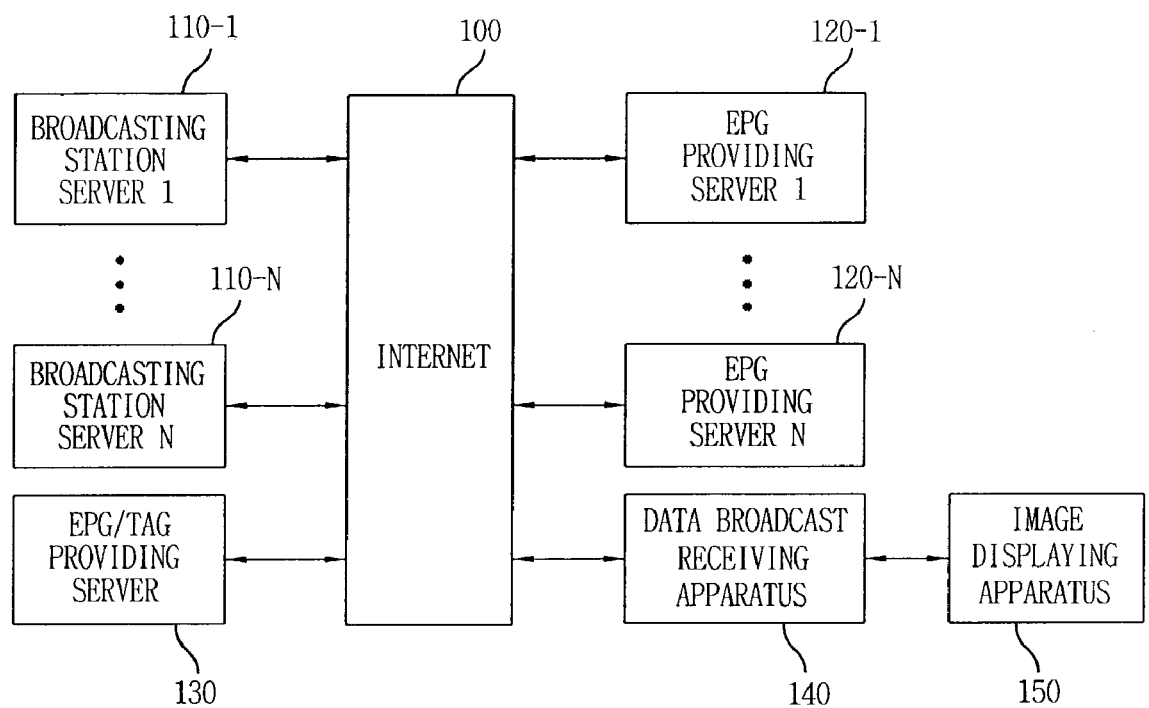
FIG. 1 is a view showing a broadcasting program viewing system using an electronic program guide in accordance with the present invention.

FIG. 1 is a view showing a broadcasting program viewing system using an EPG in accordance with the present invention.

As shown in FIG. 1, the broadcasting program viewing system using the EPG includes a plurality of broadcasting station servers 110-1~110-N which are respectively connected with a plurality of television broadcasting station, a plurality of EPG providing server 120-1~120-N which stores the EPG of the broadcasting programs which are broadcast from the television broadcasting stations through the plurality of broadcasting station servers 110-1~110-N in advance, and provides the pre-stored EPG through the internet, an EPG/tag providing server 130 which is provided with an EPG broadcast in the past, an EPG currently broadcasting, and an EPG which will be broadcast in the future from the plurality of broadcasting station servers 110-1~110-N and plurality of EPG providing servers 120-1~120-N, stores the provided EPG, writes the tag for downloading the broadcasting program guided from the provided EPG from the corresponding station server 110-1, stores the written tag together with the EPG, and providing the stored EPG and tag through the internet 100, a data broadcast receiving apparatus 140 (multimedia set-top box or Digital TV set) being connected with the EPG/tag providing server 130 through the internet 100 for downloading the EPG and tag, outputting the downloaded EPG, downloading the selected broadcasting program from the corresponding broadcasting station server 110-1 on the basis of tag corresponding to the selected broadcasting program when the viewer selects a specific broadcasting program among the broadcasting programs guided to the EPG, and transmitting the downloaded broadcasting program, and an image displaying apparatus 150 for displaying the EPG and the broadcasting program selected by the viewer. Here, the tag includes a uniform resource locator (URL) for displaying information related with the broadcasting program (for instance, ordinal times of the broadcasting program and broadcasting date) and the location where the broadcasting program is stored. That is, the broadcasting programs can be displayed on the screen of the image displaying apparatus 150 at real time using the URL included in the tag, or the broadcasting program can be downloaded. Also, the broadcasting program can be downloaded and stored or temporarily stored on the basis of the tag corresponding to the broadcasting program selected by the user. Here, the temporary storage means that the broadcasting program is reproduced storing/deleting a predetermined amount in the temporary storage space which is allotted to the storage apparatus. Wherein, the data broadcast receiving apparatus is a multimedia set-top box or a Digital TV set.

Hereinafter, the operation of the broadcasting program viewing system using the electronic program guide will be described in detail.

Firstly, the broadcasting station servers 110-1~110-N provide the EPG through homepages built by the television broadcasting station, provide the broadcasting programs which were broadcast in the past, and provide the broadcasting programs which are currently on air at real time.

The plurality of EPG providing servers 120-1~120-N store the EPG of the broadcasting programs provided from the broadcasting station servers 110-1~110-N of the television broadcasting station in advance, and provide the pre-stored EPG through the homepage which is managed separably from the broadcasting station servers 110-1~110-N, that is, through the internet 100. The plurality of EPG providing servers 120-1~120-N provide the EPG which was broadcast in the past, the EPG which is currently on air, or the EPG which will be broadcast in the future to the EPG/tag providing server 130.

The EPG/tag providing server 130 is provided with the EPG which was broadcast in the past, the EPG which is currently on air, or the EPG which will be broadcast in the future from the plurality of EPG providing servers 120-1~120-N, stores the provided EPG, writes the tag which can download the broadcasting program which is guided from the provided EPG from the corresponding broadcasting station server 110-1, stores the written tag together with the EPG, and provides the stored EPG and tag through the internet 100.

The data broadcast receiving apparatus 140 is provided with the EPG which was broadcast in the past, the EPG which is currently on air, and the EPG which will be broadcast in the future together from the EPG/tag providing server 130, stores the provided EPGs and tags, and performs data communication with the image displaying apparatus 150. At this time, the data broadcast receiving apparatus 140 connects to the corresponding broadcasting station server 110-1 on the basis of the tag of the selected program when the viewer selects a specific broadcasting program among a plurality of broadcasting programs aligned in the EPG, downloads the selected broadcasting program from the connected corresponding broadcasting server 110-1, and provides the downloaded broadcasting program to the image displaying apparatus 150. That is, with the present invention, the viewer can easily watch the selected broadcasting program from the corresponding broadcasting station server 110-1 in case the viewer selects a specific broadcasting program among the plurality of broadcasting programs aligned in the EPG. Here, the image displaying apparatus 150 is a displaying apparatus such as a television, monitor and the like.

Hereinafter, the broadcasting program viewing method using the EPG will be described in detail with reference to FIGS. 2A to 2B.

Figure 2A:
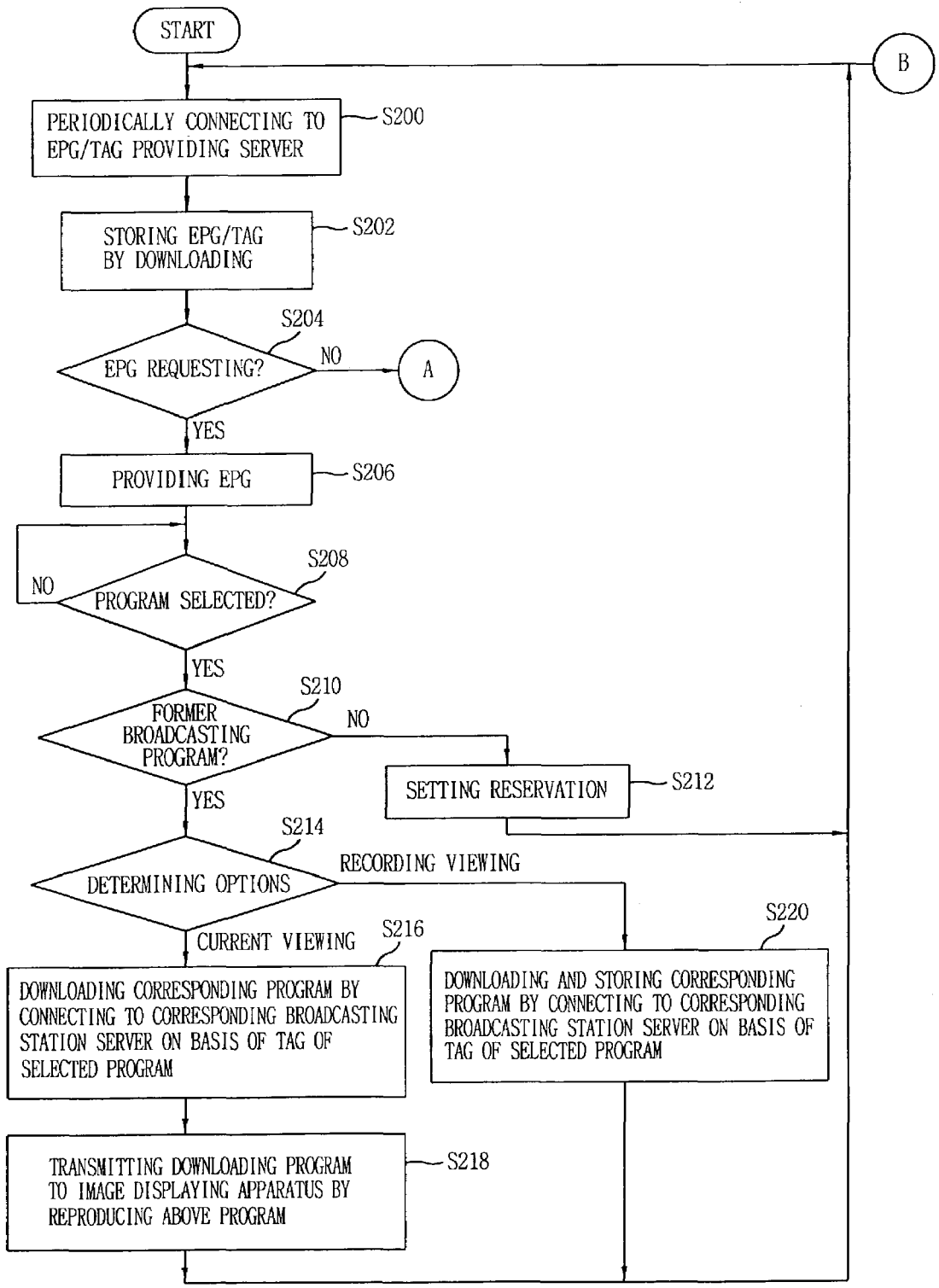
FIGS. 2A and 2B are flow charts illustrating a broadcasting program viewing method using the electronic program guide in accordance with the present invention.
Figure 2B:
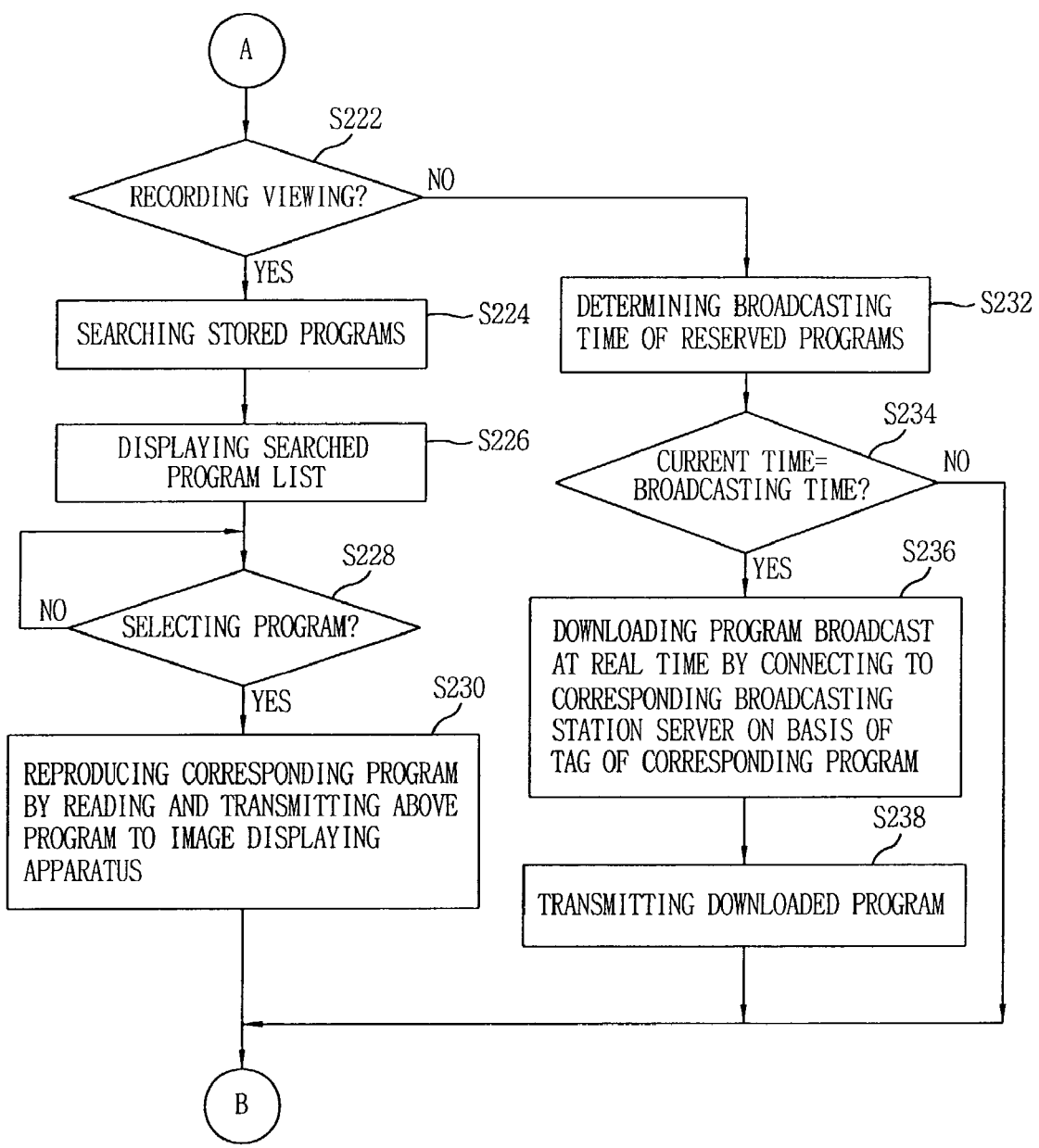

FIGS. 2A and 2B are flow charts illustrating a broadcasting program viewing method using the electronic program guide in accordance with the present invention.

Firstly, the data broadcast receiving apparatus 140 is periodically connected to the EPG/tag providing server 130 through the internet 100 (S200).

The data broadcast receiving apparatus 140 downloads a tag which can download the EPGs in the past, present and future which are provided from the EPG/tag providing server 130 through the internet 100 and the broadcasting program which is guided in the EPG, from the corresponding broadcasting station server 110-1~110-N, and stores the downloaded tag (S202).

Here, the EPG/tag providing server 130 is provided with the EPGs of the past, present and future dates from the plurality of broadcasting station servers 110-1~110-N and plurality of EPG providing servers 120-1~120-N, and stores the provided EPG, for instance, the EPG for the past three days to the upcoming seven days on the basis of the current date. Also, the EPG/tag providing server 130 writes a tag which can download the corresponding broadcasting program being connected to the corresponding broadcasting station server 110-1 of the respective broadcasting programs guided to the stored EPG, and stores the written tag together with the EPG. For instance, "ABC broadcasting station" of the US provides a broadcasting program 'A drama' for 16 times which was broadcast in the past on the basis of the current date as the 'Jul. 9, 2001 ABC 22:00-22:50 A drama 16' through the EPG. The EPG/tag providing server 130 writes a tag of 'web site: www.abci.com/..../A drama__16.asf' for the broadcasting program 'A drama' and stores the tag together with the EPG.

That is, the data broadcast receiving apparatus 140 in accordance with the present invention connects to the EPG/tag providing server 130 in which the EPG and tag are stored, downloads the EPG and tag from the EPG/tag providing server 130, and stores the downloaded EPG and tag in the storage means such as a hard disk which is mounted therein.

Then, the image displaying apparatus 150 requests for the EPG from the data broadcast receiving apparatus 140 according to the request of the viewer. That is, the image displaying apparatus 150 requests for the EPG which is stored in the data broadcast receiving apparatus 140 by conducting data communication with the data broadcast receiving apparatus 140. At this time, the data broadcast receiving apparatus 140 determines whether the viewer requests for the EPG through the image displaying apparatus 150 (S204), reads the EPG which is stored in the internal storage means when the viewer requests for the EPG, and provides the read EPG to the image displaying apparatus 150 (S206).

The viewer checks the EPG provided from the data broadcast receiving apparatus 140 through the image displaying apparatus 150, and then the viewer can select a preferred broadcasting program among the broadcasting programs which are aligned in the EPG.

The data broadcast receiving apparatus 140 determines whether the viewer selected a specific broadcasting program among the broadcasting programs aligned in the EPG (S208), and when the viewer selects the specific broadcasting program, the viewer determines whether the selected broadcasting program is a broadcasting program which was broadcast in the past (S210).

The data broadcast receiving apparatus 140 sets 'viewing reservation' so that the viewer can watch the selected broadcasting program, in case the broadcasting program selected by the viewer in the above step S210 is not the broadcasting program which was not broadcast in the past, that is, in case the program is a program which is supposed to be broadcast in the future in the broadcasting station on the basis of the present, or the program is on air currently (S212).

Then, the data broadcast receiving apparatus 140 determines the option of the selected broadcasting program, that is, whether the viewer will currently watch the selected broadcasting program or will perform 'recording viewing' in case the broadcasting program selected by the viewer is a program that was broadcast in the past in a specific broadcasting station (S214).

The data broadcast receiving apparatus 140 searches the tag corresponding to the broadcasting program selected by the viewer when the viewer selects 'current viewing' in the above step S214, and downloads the corresponding broadcasting program selected by the viewer by connecting to the corresponding broadcasting station server 110-1 on the basis of the searched tag (S216) and transmits the program to the image displaying apparatus 150 reproducing the downloaded broadcasting program so that the viewer can watch the program (S218).

Also, the data broadcast receiving apparatus 140 searches the tag corresponding to the broadcasting program selected by the viewer when the viewer selects 'recording viewing', downloads the corresponding program selected by the viewer by connecting to the corresponding broadcasting station server 110-1 on the basis of the searched tag, and stores the downloaded broadcasting program in the storage means such as a hard disk which is mounted therein and the like (S220).

Also, the data broadcast receiving apparatus 140 determines whether the viewer selected 'recording viewing' in case the viewer did not request for the EPG in the above step S204 (S222). That is, the data broadcast receiving apparatus 140 determines whether the viewer will watch the predetermined downloaded broadcasting program by selecting 'recording viewing' in the above step S214.

The data broadcast receiving apparatus 140 searches the whole broadcasting programs stored by downloading from the broadcasting station server 110-1 (S224) in case the viewer selected 'recording viewing' in the above step S222, displays the list of the searched broadcasting programs by transmitting them to the image displaying apparatus 150, and determines whether the viewer selected the preferable broadcasting program among the lists of the broadcasting programs displayed on the screen of the image displaying apparatus 150 (S228).

In case the viewer selects the preferred broadcasting program in the above step S228, the data broadcast receiving apparatus 140 transmits the reproduced broadcasting program to the image displaying apparatus 150 so that the viewer can reproduce the selected program by reading it from the storage means, and can watch the reproduced broadcasting program (S230).

In case the viewer did not select 'recording viewing' in the above step S222, the data broadcast receiving apparatus 140 determines the broadcasting time of the broadcasting programs 'reserved' by the viewer (S232), and determines whether the determined broadcasting time and the current time are identical (S234).

The data broadcast receiving apparatus 140 downloads the broadcasting program which is broadcast at real time by connecting to the corresponding broadcasting station 110-1 S236 on the basis of the tag corresponding to the corresponding program in case the broadcasting time of the reserved program and the current time are identical in the above step S234, and transmits the reproduced program to the image displaying apparatus 150 after downloading the broadcasting program so that the viewer can watch the program (S238).

As described above, in the present invention, the viewer can easily watch the broadcasting program which was broadcasting program which was is of the tag of the selected broadcasting program when the viewer selects the preferred broadcasting program through the stored EPG by storing the tag which can download the EPG of the past, present and future provided from the EPG/tag providing server and the broadcasting program in the EPG.

Also, with the present invention, the viewer can easily store the broadcasting program which was broadcast in the past on the basis of the selected broadcasting program when the viewer selects the preferred broadcasting program through the EPG, by storing the tag which can download the EPG of the past, present and future provided from the EPG/tag providing server and the broadcasting program in the EPG.

Also, with the present invention, the viewer can easily store the broadcasting program which was broadcast in the past on the basis of the tag of the selected broadcasting program when the viewer selects a preferred broadcasting program through the stored EPG, and can easily watch the stored broadcasting program, by storing the tag which can download the EPG of the past, present and future provided from the EPG/tag providing server and the broadcasting program in the EPG.

Also, with the present invention, the viewer can easily watch a reserved broadcasting program on the basis of the tag of the broadcasting program reserved by the viewer even if the viewer reserves a broadcasting program which is currently on air or which will be broadcast in the future, by storing the tag which can download the EPG of the past, present and future provided from the EPG/tag providing server and the broadcasting program in the EPG.

Also, with the present invention, the viewer can watch a broadcasting program by easily selecting preferred predetermined broadcasting programs, and there is no need to search for the broadcasting program which was broadcast in the past or the preferred program after connecting to all homepages of the corresponding broadcasting stations, by storing the tag which can download the EPG of the past, present and future provided from the EPG/tag providing server and the broadcasting program in the EPG.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A broadcasting program displaying apparatus using an electronic program guide (EPG), the apparatus comprising:
    a data broadcast receiver configured to periodically download an EPG for guiding broadcasting programs and tags for downloading the broadcasting programs guided to the EPG from a server via an Internet network, transmit the downloaded EPG to an image displaying apparatus, receive broadcasting programs from a corresponding broadcasting server on the basis of the tags when the broadcasting programs are selected by a user, and transmit the broadcasting programs to the image displaying apparatus, wherein the data broadcast receiver determines whether the selected broadcasting program is a broadcasting program to be broadcast in the future, and reserves the selected broadcasting program selected by a viewer when the selected broadcasting program is the broadcasting program to be broadcast in the future; and
    a storage unit configured to download the selected broadcasting program from a corresponding broadcasting server on the basis of the tag of the selected broadcasting program, and store the downloaded broadcasting program,
    wherein the EPG and tag corresponds to a past EPG and tag that is different than a currently broadcasting EPG and tag such that the past tag can be selected to view the past EPG and selected broadcasting program, and wherein the tag includes a uniform resource locator (URL) for displaying the location where information related to the broadcasting program and the broadcasting program are stored, and an ordinal time of the broadcasting program and broadcasting date,
    wherein the EPG and tag further includes another EPG and tag corresponding to the EPG currently broadcasting and the tag corresponding to the EPG currently broadcasting, and an EPG which will be broadcast in the future and a tag corresponding to the EPG which will be broadcast in the future,
    wherein the server stores the received EPGs and the tags,
    wherein the server stores past broadcast programs that have already been broadcasted such that when the viewer selects a past broadcast program from the past EPG, the image displaying apparatus displays the past broadcast program, and
    wherein the data broadcast receiver is further configured to allow the viewer to record the selected past broadcast program or to view the selected past broadcast program.

2. The apparatus of claim 1, wherein the data broadcast receiver is further configured to determine whether the selected broadcasting program is a broadcasting program to be broadcast in the future, and reserve the selected broadcasting program when the selected broadcasting program is the broadcasting program to be broadcast in the future.

* * * * *